(12) United States Patent
Wang et al.

(10) Patent No.: US 8,356,755 B2
(45) Date of Patent: Jan. 22, 2013

(54) CARD LOADING ASSEMBLY FOR ELECTRONIC DEVICE

(75) Inventors: Ya-Hui Wang, Shenzhen (CN); Yong-Gang Zhang, Shenzhen (CN); Kuan-Hung Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 111 days.

(21) Appl. No.: 12/903,307

(22) Filed: Oct. 13, 2010

(65) Prior Publication Data
US 2012/0024958 A1 Feb. 2, 2012

(30) Foreign Application Priority Data
Jul. 29, 2010 (CN) .......................... 2010 1 0240165

(51) Int. Cl.
*G06K 13/00* (2006.01)
(52) U.S. Cl. ....................................... 235/477; 235/486
(58) Field of Classification Search .................. 235/477, 235/486
See application file for complete search history.

(56) References Cited

U.S. PATENT DOCUMENTS
2006/0169764 A1* 8/2006 Ross et al. .................... 235/375

* cited by examiner

*Primary Examiner* — Daniel Hess
(74) *Attorney, Agent, or Firm* — Altis Law Group, Inc.

(57) ABSTRACT

An electronic device includes a chip card, a controlling unit, a transport mechanism, and a positioning module. The transport mechanism is electrically connected to the controlling unit and transports the chip card under the control of the controlling unit. The positioning module is electrically connected to the controlling unit and is for pushing the chip card to remove the chip card.

19 Claims, 7 Drawing Sheets

CARD LOADING ASSEMBLY FOR ELECTRONIC DEVICE

BACKGROUND

1. Technical Field

The disclosure generally relates to card holder assemblies and, particularly, to a card loading assembly for an electronic device.

2. Description of Related Art

Electronic devices, such as mobile phones, personal digital assistants (PDAs), notebook, etc, are widely used in our daily life. Chip cards, such as subscriber identity module (SIM) cards, security cards (SDs), etc, are utilized in the electronic devices to provide identification, authentication, data storage and application processing. However, to remove conventional chip cards, they must be removed from the electronic manually, which is difficult given the limited space of the electronic device.

Therefore, there is room for improvement within the art.

BRIEF DESCRIPTION OF THE DRAWINGS

Many aspects of the exemplary card loading assembly can be better understood with reference to the following drawings. The components in the drawings are not necessarily drawn to scale, the emphasis instead being placed upon clearly illustrating the principles of the card loading assembly. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
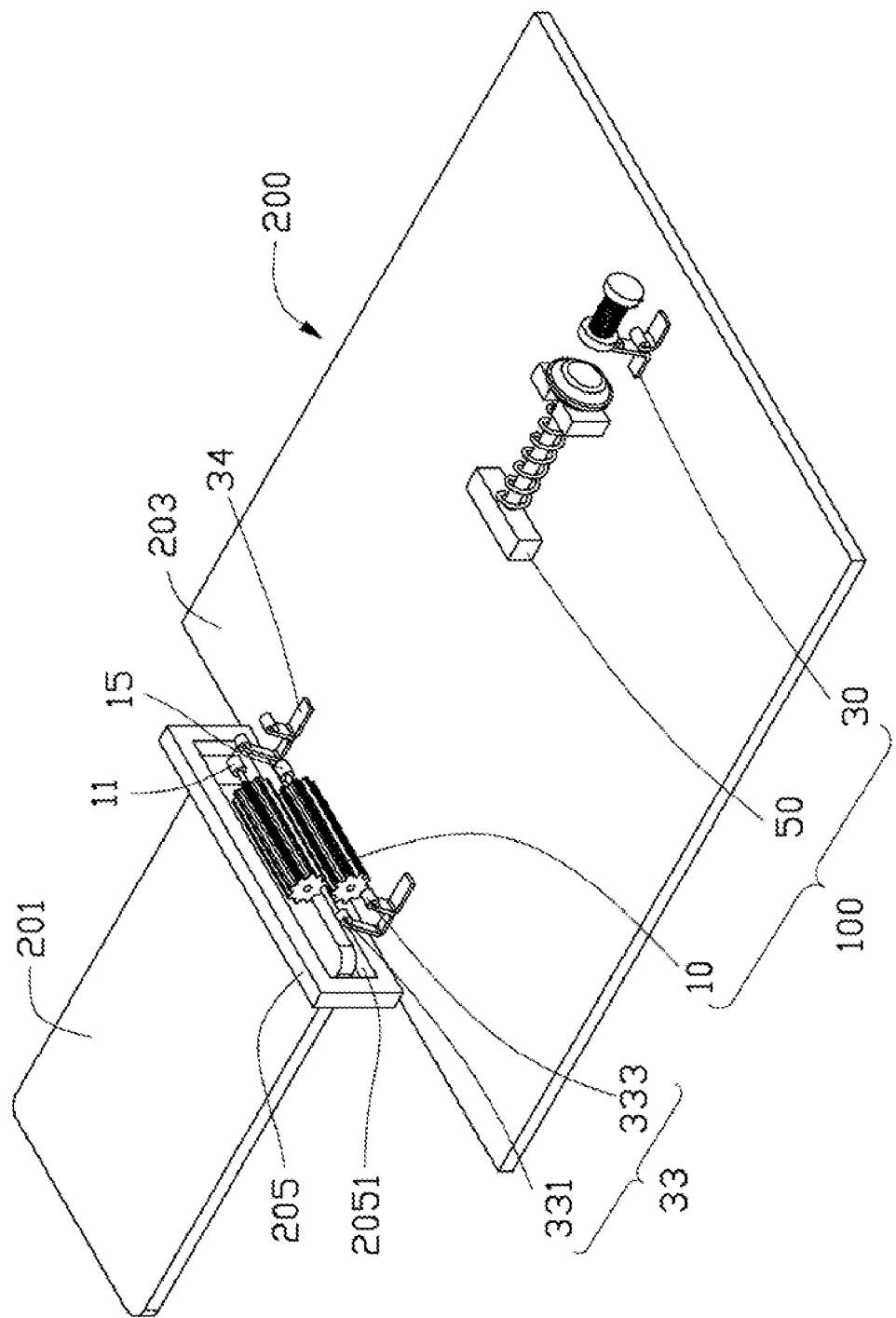
FIG. 1 is an assembled, isometric view of one portion of an electronic device with a card loading assembly.

FIG. 1 illustrates one portion of an electronic device 200. The electronic device 200 includes a card loading assembly 100, a chip card 201, a support plate 203, and a frame 205. The frame 205 is secured to one end of the support plate 203. The chip card 201 can be loaded by the card loading assembly 100 through the frame 205, thus, the chip card 201 can be installed or be ejected from the electronic device 200 automatically.

A corner of the chip card 201 is truncated/chamfered to prevent the chip card 201 from being mis-inserted. A through hole 2051 is defined in the frame 205 to form a passage for the chip card 201. A connector (not shown) is oriented at the support plate 203 to electrically connect the chip card 201 to the electronic device 200.

Figure 2:
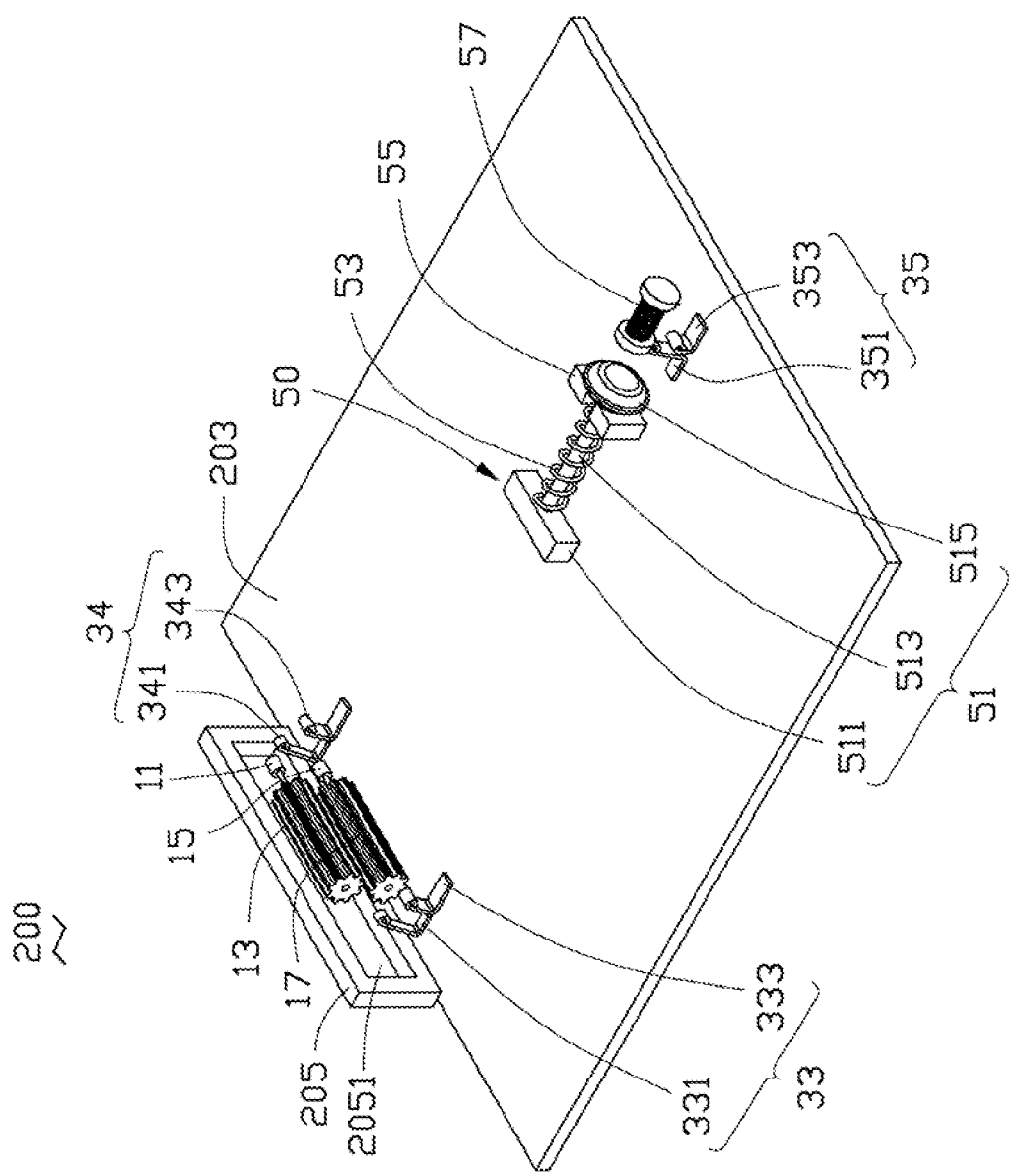
FIG. 2 is a view of the card loading assembly of FIG. 1.
Figure 3:
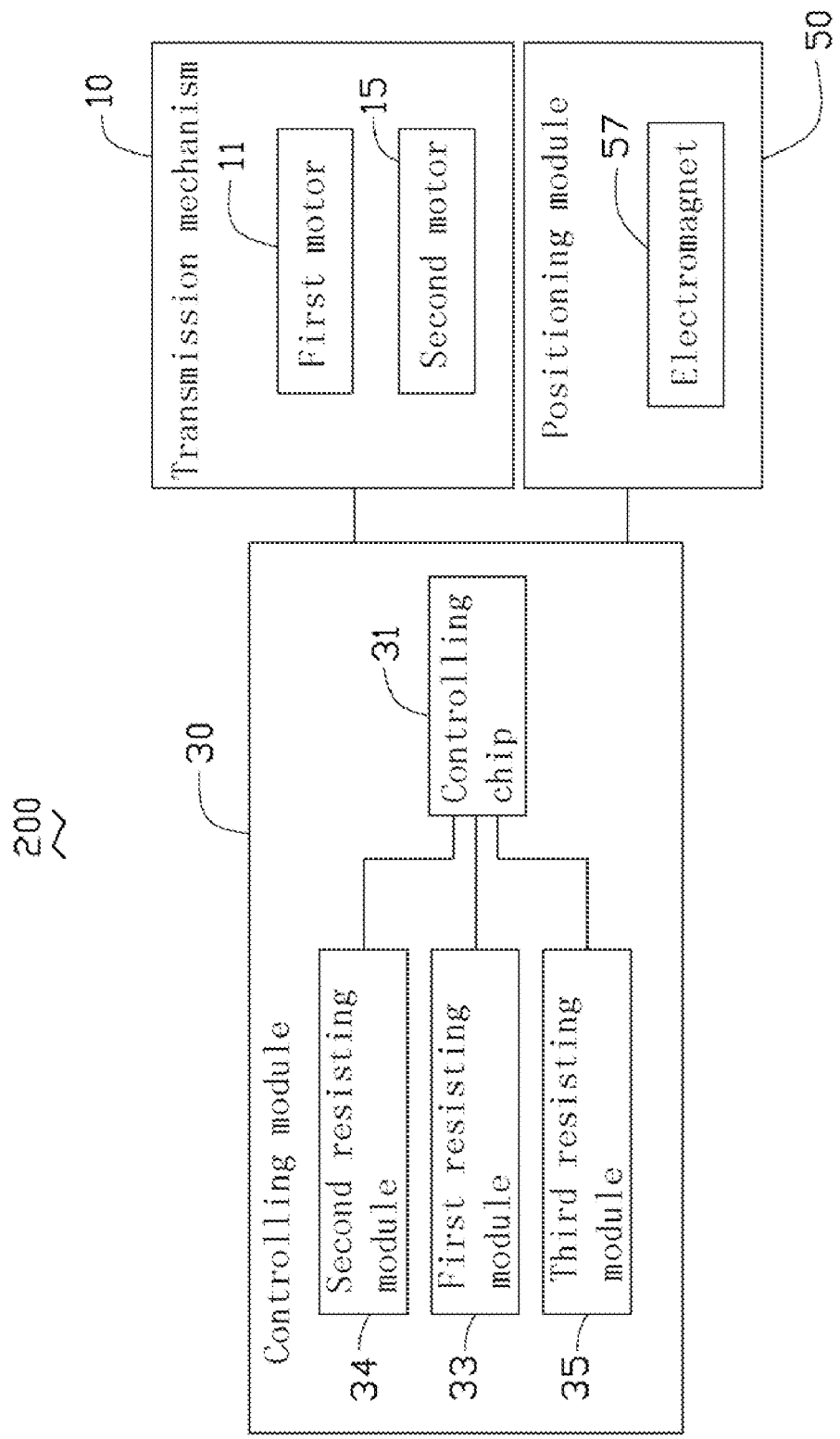
FIG. 3 is a block diagram of the electronic device.

Referring to FIGS. 2 and 3, the card loading assembly 100 includes a chip card transport mechanism 10, a controlling unit 30, and a positioning module 50. The transport mechanism 10 is for driving the chip card 201, the controlling unit 30 is electrically connected to both the transport mechanism 10 and the positioning module 50 to control the movement of the transport mechanism 10 and the positioning module 50.

The transport mechanism 10 includes a first motor 11, a first toothed roller 13, a second motor 15, and a second toothed roller 17. The first and second motors 11 and 15 are electrically connected to the controlling unit 30 and are for respectively driving the first and second toothed rollers 13 and 17 to rotate. In the exemplary embodiment, the first toothed roller 13 and the second toothed roller 17 can be made of elastic material.

The controlling unit 30 includes a controlling chip 31, a first switch 33, a second switch 34, and a third switch 35. Each of the switches 33, 34 or 35 is electrically connected to the controlling chip 31.

The first switch 33 includes a first electrical contact 331 and a second electrical contact 333. The first and second electrical contacts 331 and 333 are substantially L-shaped and are made of metal, such as iron or copper. The first contact 331 is higher than the second contact 333 in FIG. 2. When the chip card 201 is first inserted, the corner of the chip card that is not chamfered will push the first contact 331 to touch the second contact 333 to close the first switch 33. Thus, the first switch 33 is switched on. The second and third switches 34 and 35 substantially have similar structures as the first switch 33. The second switch 34 includes a first electrical contact 341 and a second electrical contact 343. The third switch 35 includes a first electrical contact 351 and a second electrical contact 353.

Figure 4:
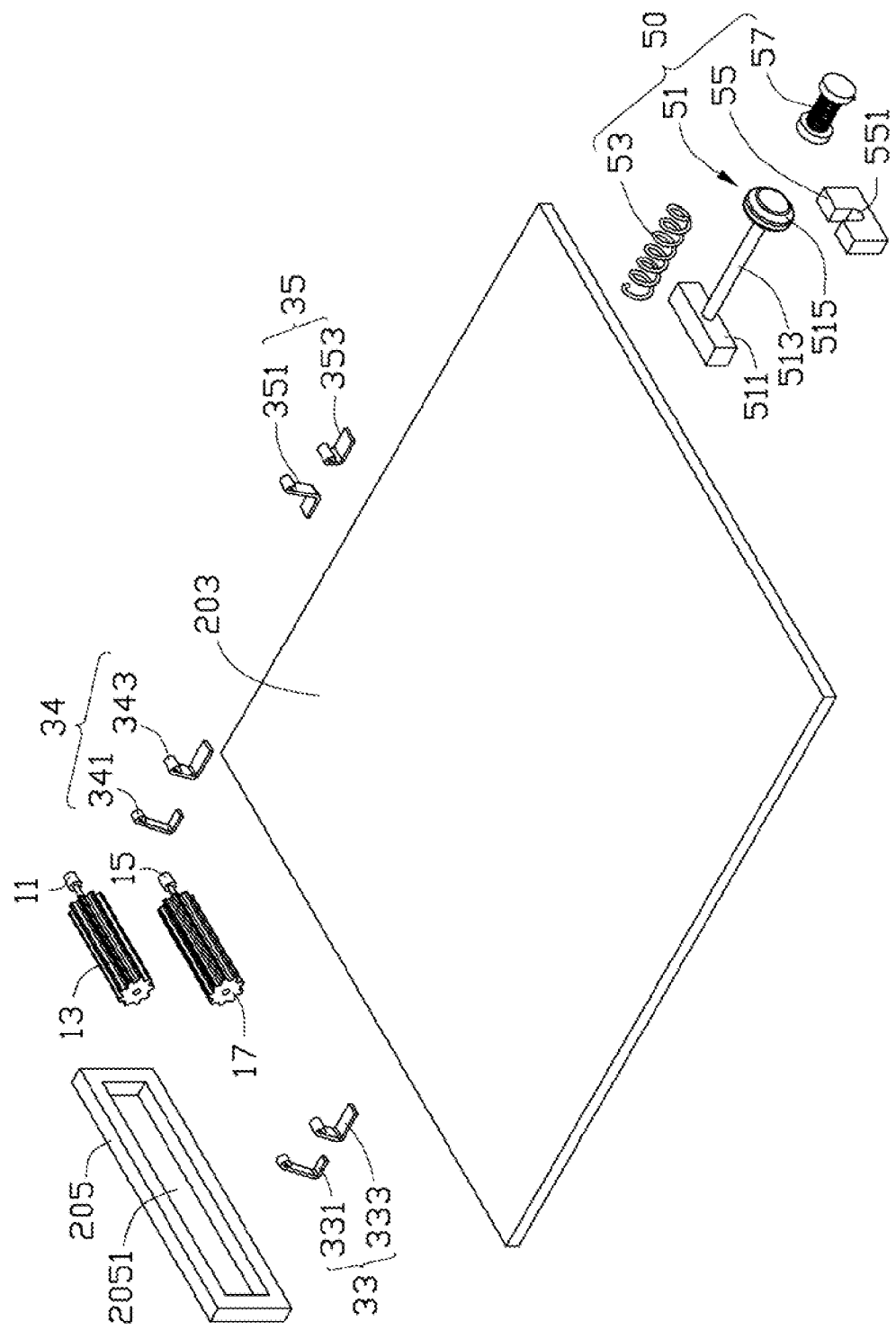
FIG. 4 is an exploded view of the card loading assembly of FIG. 1.

Referring to FIG. 4, the positioning module 50 includes an ejecting element 51, an elastic element 53, a block 55, and an electromagnet 57. The ejecting element 51 is for pushing the chip card 201 when the chip card 201 is to be ejected and removed from the electronic device 200. The block 55 is secured to the plate 203 and is for supporting the ejecting element 51.

The ejecting element 51 includes a resisting portion 511, a rod 513, and a disk portion 515. The rod 513 substantially perpendicularly projects from one side of the ejecting element 51, and the disk portion 515 is formed or secured to the distant end of the rod 513. In the exemplary embodiment, the elastic element 53 is a helix spring made of metal. A notch 551 is defined in the block 55 to allow the rod 513 to pass therethrough. The electromagnet 57 is electrically connected to the controlling chip 31. The disk portion 515 is made of magnetic material. When the electromagnet 57 is powered, the electromagnet 57 attracts the disk portion 515 to retain the ejecting element 51 in a predetermined position.

During assembly, the support plate 203 is secured to the housing of the electronic device 200. The frame 205 is oriented adjacent to one end of the plate 203. The first motor 11 is secured to the housing. The first toothed roller 13 is secured to the first motor 11 and is electrically connected to the controlling chip 31. Similarly, the second toothed roller 17 is secured to the second motor 15 and is electrically connected to the controlling chip 31. The first contact 331 and the second contact 333 of the first switch 33 are attached to the support plate 203, with the first contact 331 abutting the frame 205. Similarly, the second switch 34 is attached to the plate 203. The first contact 351 and the second contact 353 of the third switch 35 are secured to the other side of the plate 203.

Then the positioning module 50 is secured to the electronic device 200. The block 55 is fixed to the plate 203 adjacent to the third switch 35. The elastic element 53 is coiled around the rod 513, and the disk portion 515 is fixed to one end of the rod 513. The rod 513 is slidably received in the notch 551. Finally, the electromagnet 57 is secured to the housing, with one end abutting the disk portion 515. Thus, the electronic device 200 is assembled, as shown in FIG. 2.

Figure 5:
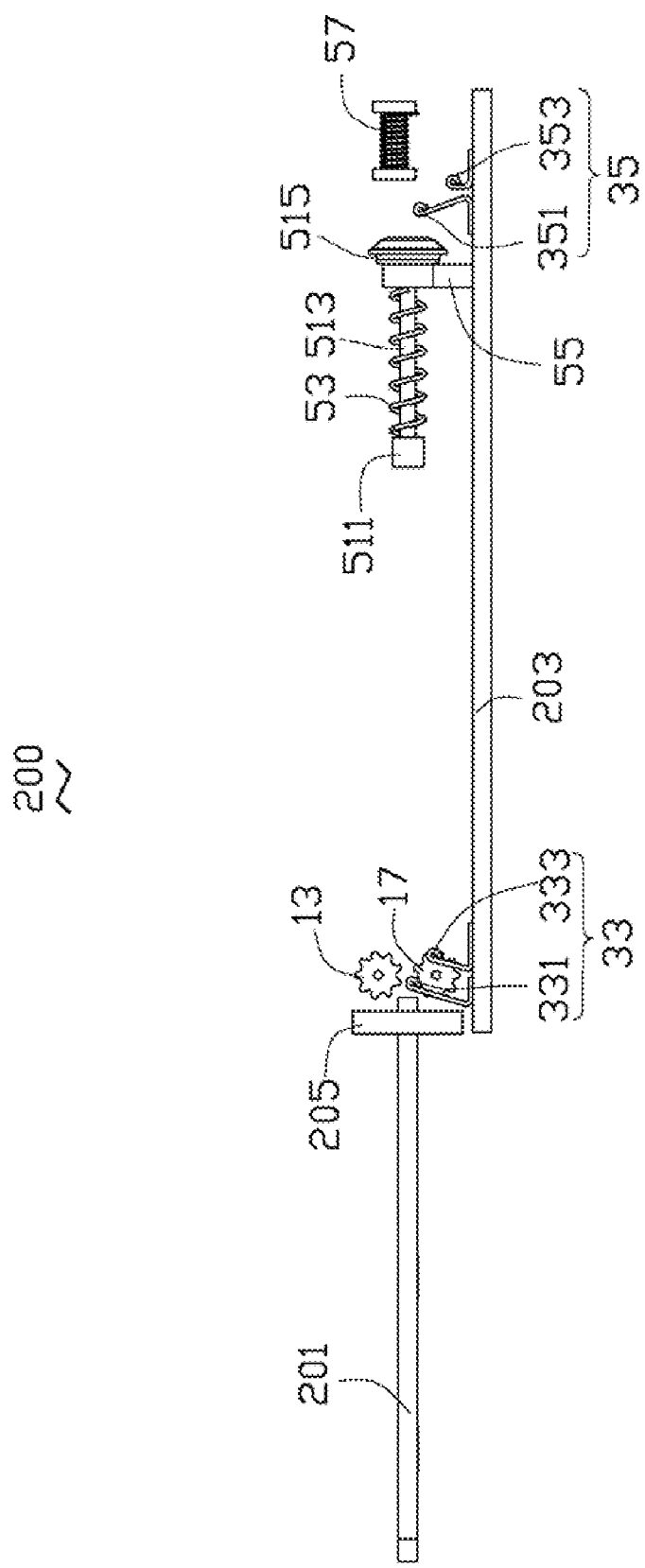
FIG. 5 is a side elevation view of the electronic device with a chip card being inserted into the electronic device.
Figure 6:
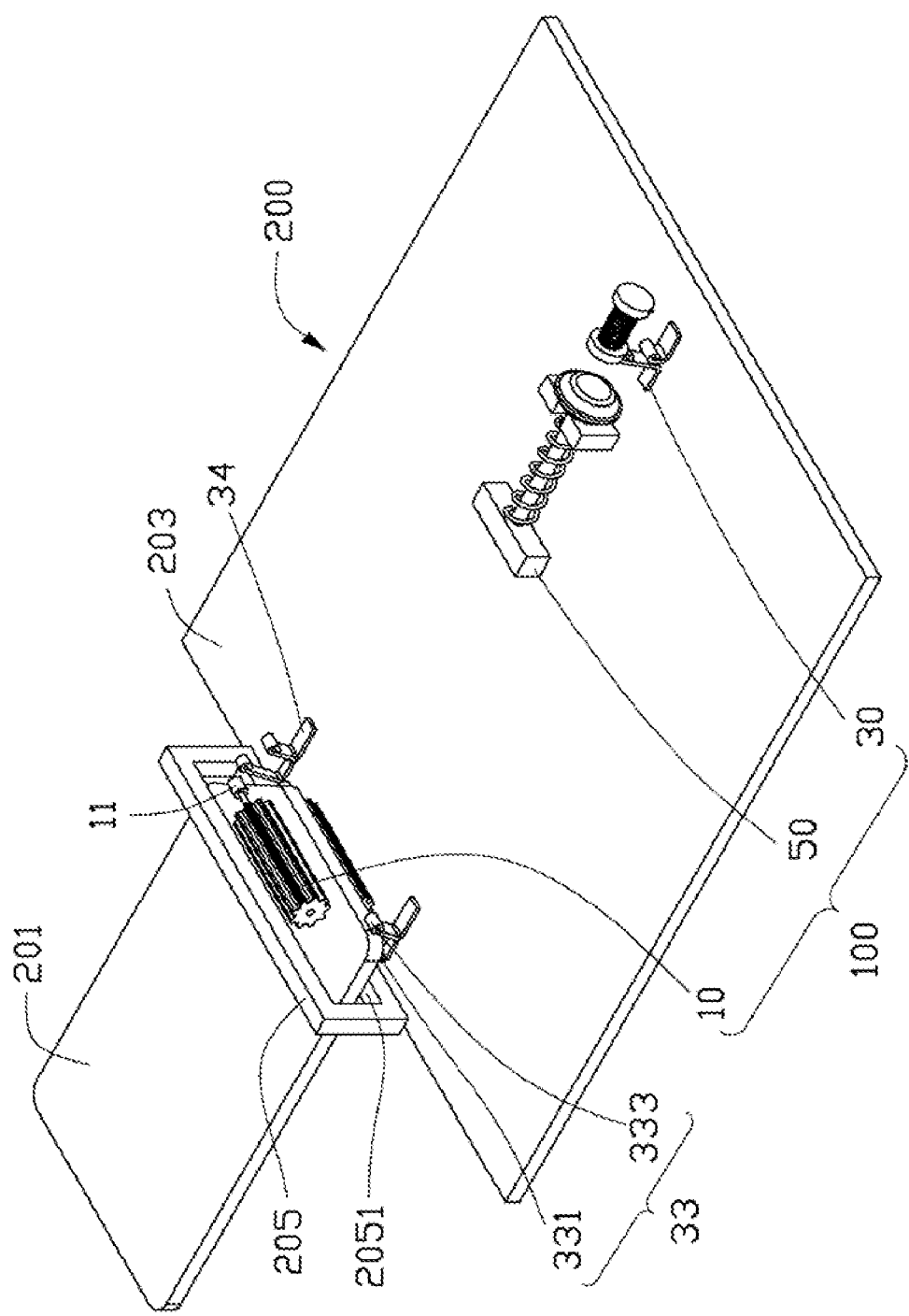
FIG. 6 is a view of the card loading assembly, with part of the chip card received in the electronic device.

Referring to FIGS. 5 and 6, to install the chip card 201 in the electronic device 200, first, the end of the chip card 201 with the truncated corner is inserted into the through hole 2051. When the chip card 201 abuts the first contact 331 of the first switch 33, the chip card 201 is further pushed by the user causing the first contact 331 to touch the second contact 333. Thus, the first switch 33 is powered on, and the first and second motors 11 and 15 are respectively switched on by the controlling chip 31. Then, the chip card 201 is driven by the first and second toothed rollers 13 and 17, and moves towards the ejecting element 51.

Figure 7:
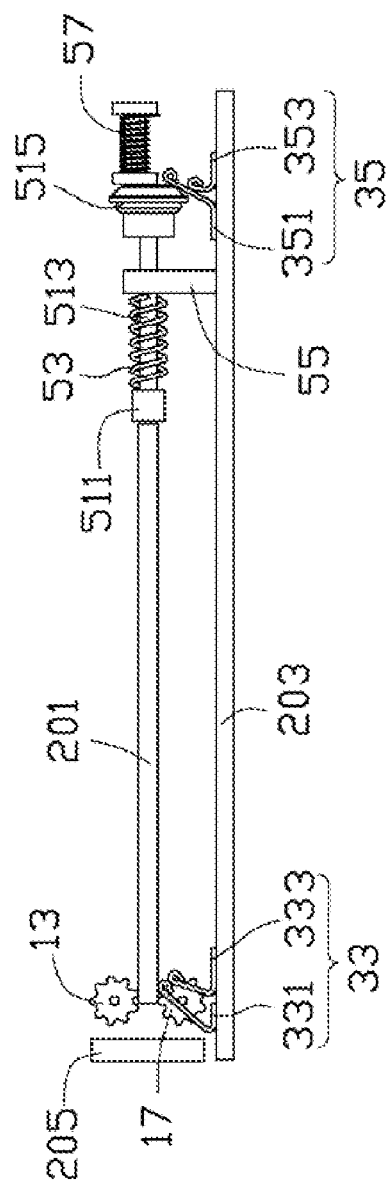
FIG. 7 is similar to FIG. 5, but with the chip card received in the electronic device.

When the chip card 201 moves, the first contact 341 is forced to bend down and contact the second contact 343, thus, the second switch 34 is powered on. The chip card 201 pushes against the ejecting element 51 moving the ejecting element 51 along the block 55. When the ejecting element 51 moves, the elastic element 53 elastically deforms. The ejecting element 51 moves until the disk portion 515 pushes the first contact 351 into contact with the second contact 353. When the first contact 351 is contacted to the second contact 353, the third switch 35 is powered on, and the electromagnet 57 is powered on and attracts the disk portion 515 and the controlling chip 31 stops the first and second motors 11 and 15 rotating. Thus, the chip card 201 is secured to the electronic device 200, as shown in FIG. 7.

When the chip card 201 is incorrectly inserted, the first switch 33 cannot be switched on before the second switch 34, and the controlling chip 31 disables the first motor 11, thus, the electronic device 200 can prevent the chip card 201 from being incorrectly inserted.

When the chip card 201 is to be removed, the electromagnet 57 is powered off by the controlling chip 31 and the first and second motors 11 and 15 reverse, the chip card 201 is pushed by the ejecting element 51 and is driven by the first and second toothed rollers 13 and 17. One end of the chip card 201 is pushed out of the through hole 2051, and the chip card 201 can then be easily grasped and removed from the electronic device 200. At the same time, the first contact 351 rebounds to its original position and shape separates from the second contact 351, thus, the third switch 35 is powered off. Similarly, the first and second modules 33 are powered off.

It is to be understood, the second motor 15 can be omitted, thus, the second toothed roller 17 is configured as a driven toothed roller when the card loading assembly 100 is used for removing the chip card 201.

The exemplary embodiments of the electronic device 200, the chip card 201 is automatically assembled or removed by the card loading assembly 100, thus, the electronic device 200 is easy to use.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A card loading assembly comprising:
    a controlling unit;
    a transport mechanism, the transport mechanism including two spaced apart toothed rollers being electrically connected to the controlling unit; the toothed rollers being made of elastic material, and controlled to rotate for transporting and
    a positioning module, the positioning module electrically connected to the controlling unit.

2. The card loading assembly claimed of claim 1, wherein the controlling unit includes a controlling chip and a first switch electrically connected to the controlling chip, the transport mechanism further includes two motors for driving the toothed rollers, each motor and the positioning module are electrically connected to the controlling chip, and the first switch is for powering on or powering off the motor by the controlling chip.

3. The card loading assembly claimed of claim 1, wherein the first switch includes a first electrical contact and a second electrical contact, the first and second contacts are of metal, the first contact can elastically touch the second contact.

4. The card loading assembly claimed of claim 1, wherein the positioning module includes an ejecting element and an electromagnet, the electromagnet is electrically connected to the controlling chip, and the electromagnet attracts the ejecting element when the electromagnet is powered on by the controlling chip.

5. The card loading assembly claimed of claim 4, wherein the card loading assembly further includes a second switch electrically connected to the controlling chip, the second switch includes a first contact and a second contact, the first and second contacts are of metal, the first contact can be elastically bent down to connect to the second contact.

6. The card loading assembly claimed of claim 4, wherein each toothed roller is a gear.

7. A card loading assembly for moving a chip card, the card loading assembly comprising:
    a transport mechanism including two spaced apart toothed rollers, the toothed rollers being made of elastic material, and rotating for transmitting the chip card disposed between the toothed rollers; and
    a positioning module, abutting one end of the chip card, the positioning module pushing the chip card when the chip card is to be removed.

8. The card loading assembly claimed of claim 7, wherein the card loading assembly further includes a controlling unit, the transmission further includes a motor, the controlling unit includes a controlling chip and a first switch electrically connected to the controlling chip, the motor and the positioning module are electrically connected to the controlling chip, and the first switch is for powering on or powering off the motor by the controlling chip.

9. The card loading assembly claimed of claim 8, wherein the first switch includes a first contact and a second contact, the first and second contacts are of metal, the first contact can be elastically bent down to connect to the second contact.

10. The card loading assembly claimed of claim 9, wherein the positioning module includes a ejecting element and an electromagnet, the electromagnet is electrically connected to the controlling chip, and the electromagnet attracts the ejecting element when the electromagnet is powered on by the controlling chip.

11. The card loading assembly claimed of claim 10, wherein the card loading assembly further includes a second switch electrically connected to the controlling chip, the second switch includes a first contact and a second contact, the first and second contacts are of metal, the first contact can be elastically bent down to connect to the second contact.

12. The card loading assembly claimed of claim 8, wherein each toothed roller is a gear, the gears drive the chip card.

13. An electronic device comprising:
   a controlling unit;
   a transport mechanism, connected to the controlling unit, the transport mechanism including two spaced apart toothed rollers, the toothed rollers being made of elastic material, and transferring a chip card under the control of the controlling unit; and
   a positioning module, the positioning module electrically connected to the controlling unit and pushing the chip card to remove the chip card.

14. The electronic device claimed of claim 13, wherein the controlling unit includes a controlling chip and a first switch electrically connected to the controlling chip, the transport mechanism includes a motor for driving one of the rollers, the motor and the positioning module are electrically connected to the controlling chip, and the first switch is for powering on or powering off the motor by the controlling chip.

15. The electronic device claimed of claim 14, wherein the first switch includes a first electrical contact and a second electrical contact, the first and second contacts are of metal, the first contact can be elastically bent down to connect to the second contact.

16. The electronic device claimed of claim 15, wherein the positioning module includes a ejecting element and an electromagnet, the electromagnet is electrically connected to the controlling chip, and the electromagnet attracts the ejecting element when the electromagnet is powered on by the controlling chip.

17. The electronic device claimed of claim 16, wherein the electronic device further includes a second switch electrically connected to the controlling chip, the second switch includes a first contact and a second contact, the first and second contacts are of metal, the first contact can be elastically bent down to connect to the second contact.

18. The electronic device claimed of claim 17, wherein the chip card includes a corner chamfered, when the chip card is inserted in the electronic device, the first switch is powered on before the second switch.

19. The electronic device claimed of claim 14, wherein each of the toothed rollers is a gear.

* * * * *